US006954151B2

(12) United States Patent
Kawamata et al.

(10) Patent No.: US 6,954,151 B2
(45) Date of Patent: Oct. 11, 2005

(54) SELECTOR SWITCH FOR SUPERVISORY REMOTE CONTROL SYSTEM

(75) Inventors: Mototsugu Kawamata, Tsu (JP); Toshiaki Tokizane, Tsu (JP); Shinji Sakasegawa, Tsu (JP)

(73) Assignee: Matsushita Electric Works, Ltd., Kadoma (JP)

( * ) Notice: Subject to any disclaimer, the term of this patent is extended or adjusted under 35 U.S.C. 154(b) by 271 days.

(21) Appl. No.: 10/202,673

(22) Filed: Jul. 25, 2002

(65) Prior Publication Data

US 2003/0020630 A1 Jan. 30, 2003

(30) Foreign Application Priority Data

Jul. 26, 2001 (JP) ....................................... 2001-226672
Jul. 26, 2001 (JP) ....................................... 2001-226673

(51) Int. Cl.[7] .................................................. H04Q 1/00
(52) U.S. Cl. ............................ 340/825.53; 340/825.07; 340/310
(58) Field of Search .................................... 340/825.07

(56) References Cited

U.S. PATENT DOCUMENTS 5,307,058 A * 4/1994 Tokizane et al. ........... 340/3.21

FOREIGN PATENT DOCUMENTS

| | | | |
|---|---|---|---|
| GB | 2338809 | * 12/1999 | ............ H04Q/9/00 |
| JP | 6-14366 | 1/1994 | |
| JP | 6-14378 | 1/1994 | |
| JP | 6-269070 | 9/1994 | |
| JP | 7-240979 | 9/1995 | |
| JP | 2505017 | 4/1996 | |
| JP | 8-251675 | 9/1996 | |
| JP | 11-348391 | 12/1999 | |
| JP | 2000-10621 | 1/2000 | |
| JP | 2000-358287 | 12/2000 | |
| JP | 2001-27911 | 1/2001 | |

* cited by examiner

*Primary Examiner*—Michael Horabik
*Assistant Examiner*—Matsuichiro Shimizu
(74) *Attorney, Agent, or Firm*—Oblon, Spivak, McClelland, Maier & Neustadt, P.C.

(57) ABSTRACT

A selector switch for a supervisory remote control system is provided. This control system comprises operation terminals such as switches and control terminals such as relays, and a signal line for connecting a signal transmission unit to the operation and control terminals. Each of the operation and control terminals has an individual address. The transmission unit provides a control signal to the signal line according to a time-division-multiplexing manner such that when one of the operation terminals is operated, a load connected to the control terminal in an address correspondence with the operation terminal can be controlled. The selector switch comprises a data receiver for receiving data including conditions of loads connected to the control terminals from the transmission unit through the signal line, a memory for storing the data received by the data receiver, a selector for selecting desired information from the data in the memory, and an output unit for providing the desired information to an external device such as personal computers according to an order of the selector.

13 Claims, 11 Drawing Sheets

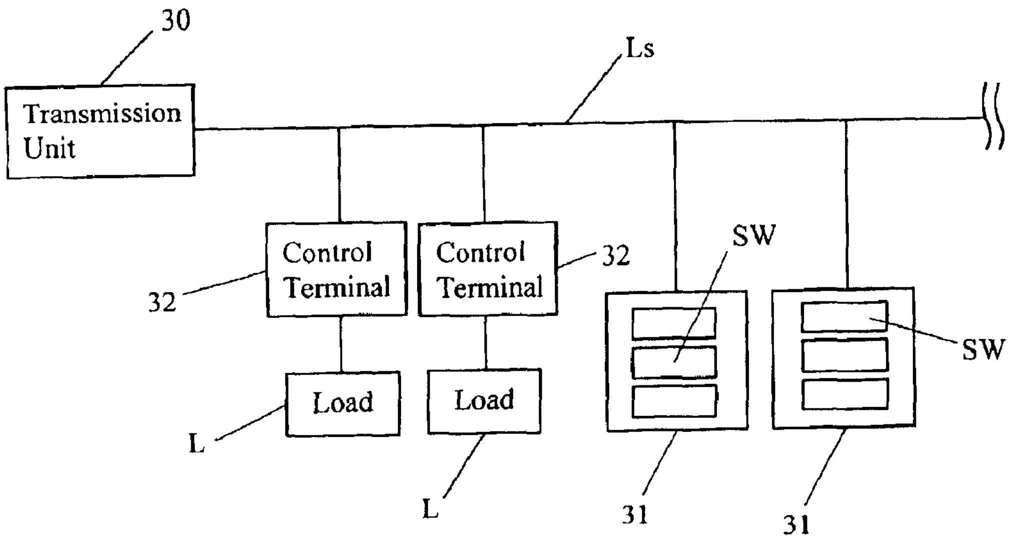
FIG. 1
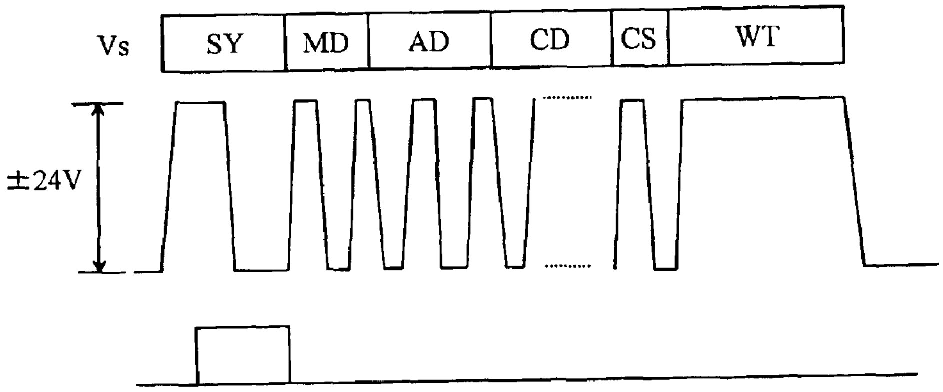
FIG. 2A
FIG. 2B
FIG. 2C

| ID | Product Code | Version | Release | Parity |
|---|---|---|---|---|

SELECTOR SWITCH FOR SUPERVISORY REMOTE CONTROL SYSTEM

BACKGROUND OF THE INVENTION

1. Field of the Invention

The present invention relates to a selector switch for a supervisory remote control system, by use of which a user can easily edit, revise or print out various control data of loads such as lighting apparatus to be controlled in the supervisory remote control system.

2. Disclosure of the Prior Art

In the past, a supervisory remote control system for remotely controlling various loads such as lighting apparatus and air conditioner has been utilized in large structures such as library, shopping mall and office building. For example, a portable setting device for the supervisory remote control system is disclosed in Japanese Patent Early Publication [kokai] No. 2000-358287. That is, as shown in FIG. 1, the supervisory remote control system comprises a signal transmission unit 30 for supplying a control signal according to a time-division-multiplexing manner, a plurality of operation terminals 31 having switches SW for operating loads L such as lighting apparatus, a plurality of control terminals 32 such as relays, which are connected to the loads L, and a signal line Ls for connecting the transmission unit 30 to the operation and control terminals (31, 32). Each of the operation terminals 31 and the control terminals 32 has an individual address.

In this remote control system, when a set of a relation data including an information of one-to-one address correspondence between one of the control terminals 32 and one of the operation terminals 31 and a control data including control conditions of the load L are set in the transmission unit 30, the load connected to the control terminal can be controlled by operation of the address-corresponding operation terminal. In addition, when a set of the relation data including an information of address correspondence between a plurality of the control terminals 32 and one of the operation terminals 31 and control data including control conditions of the loads L are set in the transmission unit 30, the loads connected to the control terminals can be controlled in a batch manner by operation of the address-corresponding operation terminal.

By the way, in this supervisory remote control system, since each of the control terminals has one address (channel), 64 control terminals are available at the maximum. In addition, each of the control terminals has a relay circuit to which four loads can be connected at the maximum. As a result, a total number of the loads that can be controlled in this supervisory remote control system are 256. In the case of checking control conditions of the loads, e.g., ON/OFF state, it is needed for a user to go to the place that deployed of each of the operation terminals and check an indicator of the operation terminal.

To solve this inconvenience, as shown in FIGS. 15 and 16, the portable setting device 1P of this prior art has a hand-held type housing 10P. Various operation buttons K1~K6 and a display 20P are arranged on a front panel of the housing. The housing mainly accommodates the display 20P, key matrix 120P (FIG. 15) used to set an address, the relation data and the control data, a data memory 110P, and a signal processor 130P for transferring the address to a required one of the operation and control terminals, and transferring the relation data and the control data stored in the data memory to the transmission unit. The signal processor 130P also comprises a data retrieving unit for retrieving at least one data set of the relation data and the control data corresponding to an address designated by the operation unit from the transmission unit, and listing a name given to the data set on the display.

By use of this setting device, it is possible to efficiently check or set the control conditions of all of loads controlled under the remote control system. However, when a total number of the loads to be controlled increases, and the control conditions of the loads are changed on a large scale for energy conservation measures or rearrangements, it is desired to edit or modify a lot of data of the control conditions by use of an external device such as personal computers, print out the edited or modified data, if necessary, or transfer new data of the control conditions of the loads prepared with the external device into the transmission unit without retyping the new data by use of the setting device. From these viewpoints, there is still plenty of room for improvement in the conventional setting device for the supervisory remote control system.

SUMMARY OF THE INVENTION

Therefore, a primary object of the present invention is to provide a selector switch for a supervisory remote control system, which can present improved convenience of editing, revising or printing out control conditions of all of loads with use of an external device such as personal computer and printer connected to the selector switch as well as various convenient functions of efficiently and easily checking or setting the control conditions of the loads at the place that deployed of the selector switch.

That is, the selector switch of the present invention is used in a supervisory remote control system comprising a plurality of operation terminals each having an individual address, a plurality of control terminals each having an individual address, and a signal line for connecting a signal transmission unit to the operation and control terminals. The transmission unit provides a control signal to the signal line according to a time-division-multiplexing manner such that when one of the operation terminals is operated, a load connected to one of the control terminals in an address correspondence with the operation terminal can be controlled. The selector switch of the present invention comprises a data receiver for receiving data including conditions of the loads connected to the control terminals from the transmission unit through the signal line, a memory for storing the data received by the data receiver, a selector for selecting desired information from the data in the memory, and an output unit for providing the desired information to an external device according to an order of the selector.

As the data, it is preferred that the data receiver receives at least one of a first control data of the loads under a group control, which is defined as a control manner that all of the loads in a predetermined region are turned on/off by operation of a single operation terminal, and a second control data of the loads under a pattern group, which is defined as a control manner that the loads in a predetermined region are turned on/off according to a pattern by operation of a single operation terminal. In this case, it is possible to easily check, edit, revise, or print out the control conditions of the loads under the group control and/or the pattern control by use of the selector switch.

In addition, it is preferred that the data receiver receives the data of an address correspondence between one of the operation terminals and the load(s) controlled by an operation of the operation terminal As the data, it is also preferred that the data receiver receives unused circuit information designating an address of the control terminal(s) that is out of use for control of the loads.

In addition, as the data, it is preferred that the data receiver receives at least one of address information of the control terminals that are out of use for the group control of the loads, and address information of the control terminals that are out of use for the pattern control of the loads. In this case, it is convenience to set new conditions of the group control and/or the pattern group.

As the data, it is preferred that the data receiver receives at least one of address information of the control terminals registered for the group control of the loads in the transmission unit and address information of the control terminals registered for the pattern control of the loads in the transmission unit. In this case, it is useful to understand the control conditions of the loads under the group control and/or the pattern control to consider energy conservation measures.

In a preferred embodiment of the present invention, the operation terminal has an indicator for indicating ON/OFF state of the load controlled by operation of the operation terminal. At this time, the selector switch may comprises a indicating-mode setting unit for setting one of first and second indicating modes in the transmission unit through the signal line. The first indicating mode is defined as an indicating mode that the indicator of the operation terminal indicates the OFF state when at least one of the loads in a predetermined region is in the OFF state, and indicates the ON state, only when all of the loads in the predetermined region are in the ON state. The second indicating mode is defined as an indicating mode that the indicator of the operation terminal indicates the ON state when at least one of the loads in the predetermined region is in the ON state, and indicates the OFF state, only when all of the loads in the predetermined region are in the OFF state.

In addition, it is preferred that the selector switch comprises a control-mode setting means for setting one of first and second control modes in the transmission unit through the signal line. The first control mode is defined as a control mode that when an operation of one of the operation terminals for a first group control, in which all of the loads in a first region are controlled by the one of the operation terminals, and an operation of the other one of the operation terminals for a second group control, in which all of the loads in a second region including at least one load of the first region are controlled by the other one of the operation terminals are performed, one performed at a later time of the these operations determines the control of the loads included in both of the first and second regions. The second control mode is defined as a control mode that when an ON operation of the operation terminal for the first group control and an OFF operation of the operation terminal for the second group control are performed, the ON operation has precedence over the OFF operation with respect to the control of the loads included in both of the first and second regions.

Moreover, it is preferred that the selector switch has a unit of displaying a version information of a program installed in the transmission unit. In this case, it is possible to easily check the version information and therefore enhance the maintenance of the supervisory remote control system.

In addition, it is preferred that the selector switch comprises an input unit for receiving control data of the loads prepared by the external device, and a data transfer unit for sending the control data received by the input unit to the transmission unit. In this case, since information of the control conditions prepared by the external device such as personal computer can be transmitted to the transmission unit through the selector switch, it is possible to further enhance setting new control conditions of the loads in the transmission unit.

Further features of the present invention and advantages brought thereby will be understood in detail from the following detail description of the preferred embodiment of the present invention referring to the attached drawings.

The present disclosure relates to subject matters contained in Japanese Patent Applications No. 2001-226672 and No. 2001-226673, filed on Jul. 26, 2001, the disclosures of which are expressly incorporated herein by reference in its entirety.

BRIEF DESCRIPTION OF THE DRAWINGS

FIG. 1 is a schematic view of a supervisory remote control system;

FIGS. 2A to 2C are operation diagrams of the remote control system;

DETAILED DESCRIPTION OF THE PREFERRED EMBODIMENT

Figure 3:
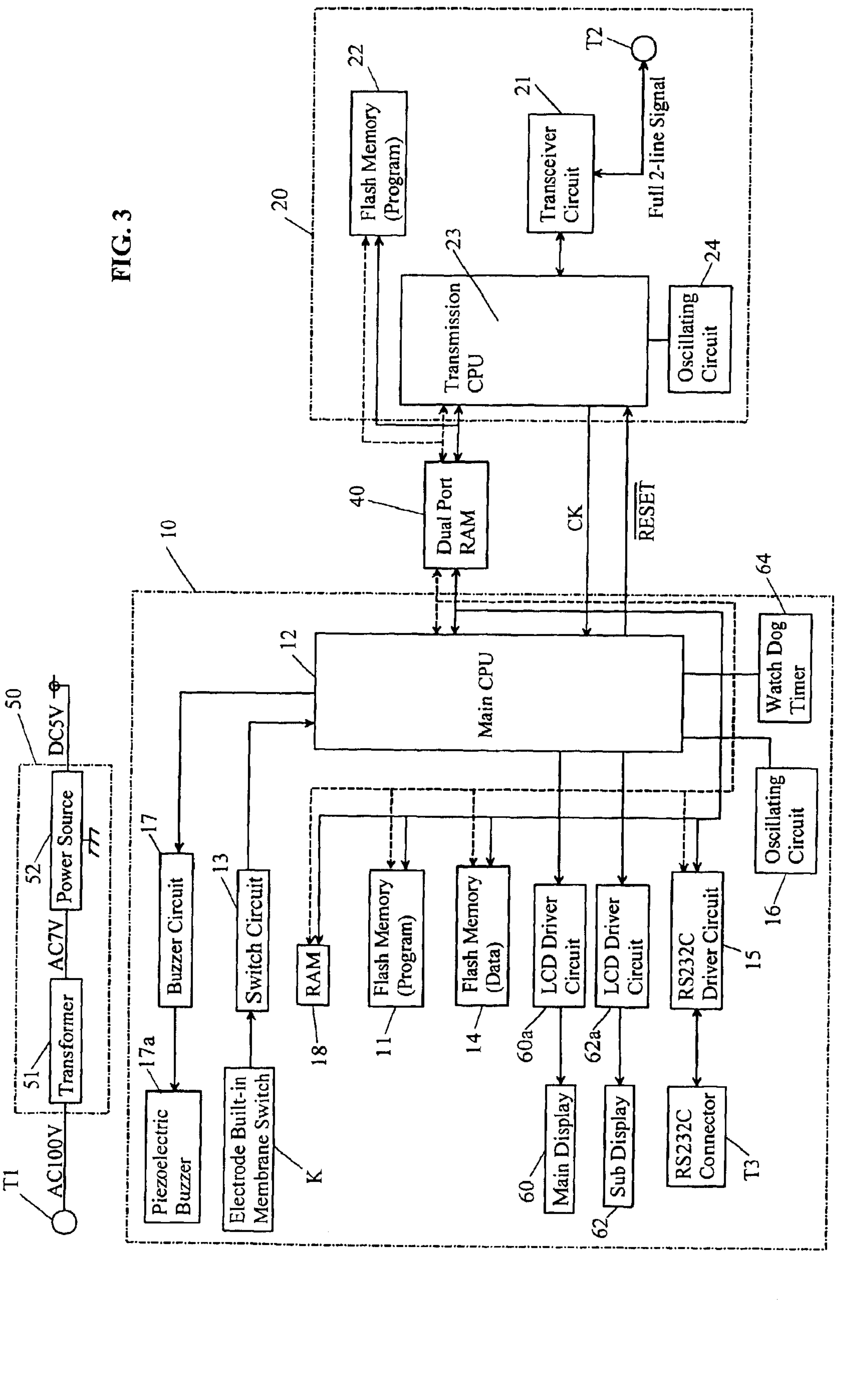
FIG. 3 is a simplified block diagram of a selector switch according to a preferred embodiment of the present invention.

Preferred embodiments of the present invention are explained below in detail, referring to the attached drawings.

As shown in FIG. 1, a supervisory remote control system comprises a signal transmission unit 30 for supplying a transmission signal according to a TDM (Time Division Multiplexing) manner, a plurality of operation terminals 31 each having an individual address, a plurality of control terminals 32 each having an individual address, and a two-line type signal line Ls for connecting the transmission unit to the operational and control terminals.

The operation terminals 31 include switches SW such as an individual switch, a pattern switch and a light-adjustment switch. The control terminals 32, for example, include a relay terminal for controlling a relay placed between the load L and a power source, a light-adjustment terminal for adjusting a light amount of the lighting apparatus as the load L, and so on. The transmission unit 30 can individually identify the operation and control terminals 31, 32 according to address information. It is preferred that the operation terminal 31 has a check lamp (not shown) of a light-emitting diode as a means of indicating the operating state of the loads L.

The transmission unit 30 provides the transmission signal Vs having a format shown in FIG. 2A to the signal line Ls. The transmission signal is a TDM (Time Division Multiplexing) signal of dual-polarity (±24 V), which includes a start pulse signal SY indicative of the start of sending signal, mode data MD indicative of a signal mode, address data AD for individually identifying the operation and control terminals 31, 32, control data CD for controlling the loads L such as the lighting apparatus, checksum data CS for detecting a transmission error, and a signal returning period WT that is a time slot for receiving a return signal from the operation terminal 31 or the control terminal 32.

As shown in FIG. 2B, the data transmission is performed according to a PWM (Pulse-Width Modulation) manner. In each of the operation and control terminals 31, 32, when the address data AD of the transmission signal Vs received through the signal line Ls is in agreement with a predetermined address, the control data CD is captured from the transmission signal Vs, and the supervisory data is returned as an electric-current mode signal during the signal returning period WT. The electric-current mode signal is a signal generated by making a short circuit in the signal line Ls through suitable low impedance.

When transmitting a data from the transmission unit 30 to a desired one of the operation terminals 31 or the control terminals 32, the transmission signal Vs including the mode data MD as the control mode and an address of the desired operation or control terminal as the address data AD is sent out. When this transmission signal Vs is provided to the signal line Ls, the operation terminal or the control terminal in agreement with the address data AD receives the control data CD, and returns the supervisory data during the signal returning period WT. The transmission unit 30 checks as to whether the control data has been transmitted to the desired operation or control terminal according to the relationship between the sent control data CD and the supervisory data received during the signal returning period WT. The control terminal 32 outputs a load-control signal for controlling the lighting device L as the load according to the received control data CD. On the other hand, the operation terminal 31 outputs a supervisory signal for indicating the operating state of the lighting device L on the check lamp according to the received control data CD.

Under normal conditions, the transmission unit 30 sends out the transmission signal Vs including the mode data MD as a dummy mode at a regular time interval (Normal Polling). When there is an information to be transmitted from the operation terminal 31 to the transmission unit 30, this operation terminal 31 generates an interrupt signal in synchronization with the pulse start signal SY of the transmission signal Vs having the dummy mode, as shown in FIG. 2C. At this time, an interrupt flag is set to make ready for information exchange with the transmission unit 30. When the transmission unit 30 receives the interrupt signal, the transmission signal having the mode data MD as an interrupt polling mode is sent out, while a high-order half of bits of the address data AD being increased in order. For example, when the address data AD is 8 bits, high-order 4 bits are increased in order. In the operation terminal 31 that generated the interrupt signal, when the high-order 4 bits of the address data AD of the transmission signal having the interrupt polling mode are in agreement with high-order 4 bits of the address set in the operation terminal 31, low-order 4 bits of the address are returned to the transmission unit 30 during the signal returning period WT. Thus, since the transmission unit 30 checks every 16 operation terminals 31 to find the specific operation terminal that generated the interrupt signal, it is possible to find the specific operation terminal 31 within a relatively short time period.

When the transmission unit 30 captures the address of the operation terminal 31 that generated the interrupt signal, the transmission signal having the mode data MD as a supervisory mode and the captured address data AD is sent out to the signal line Ls. Against this transmission signal, the operation terminal 31 returns information to be transmitted during the signal returning period WT. Finally, the transmission unit 30 sends out an interrupt reset signal to the operation terminal 31 that generated the interrupt signal to cancel the interrupt flag of the operation terminal 31. According to the above-described manner, the transmission of information from the operation terminal 31 to the transmission unit 30 is completed by four signal transmissions (dummy mode, interrupt polling mode, supervisory mode, and interrupt reset) from the transmission unit 30 to the operation terminal 31. To check the operating condition of a desired control terminal 32, the transmission unit 30 sends out the transmission signal having the mode data MD as the supervisory data.

Thus, when the switches of the operation terminal 31 are operated to generate an operation data, the operation data is returned from the operation terminal 31 to the transmission unit 30. The transmission unit 30 transmits a transmission signal including the control data CD prepared according to the operation data to the control terminal 32, so that the control terminal 32 controls the load L. At this time, the control terminal 32 returns a supervisory data to the transmission unit 30. The returned supervisory data is transmitted to the operation terminal 31. According to this transmission signal, the operation terminal 31 turns on and off the check lamp.

By the way, in the supervisory remote control system, the transmission unit 30 manages relations of address correspondence between the operation terminals and the control terminals. Therefore, when a set of relation data including an address correspondence between a single operation terminal and a plurality of loads L and control data including control parameters of the loads L are set in the transmission unit 30, the loads L can be controlled in a batch manner by operation of the single operation terminal. As such a control manner, there are a group control and a pattern control of the loads L. In the group control, all of the loads in a predetermined region are turned on/off by operation of a single operation terminal. On the other hand, in the pattern control, the loads in a predetermined region are turned on/off according to a pattern by operation of a single operation terminal. The pattern control and the group control can be achieved by suitably programming the address correspondence.

Figure 4:
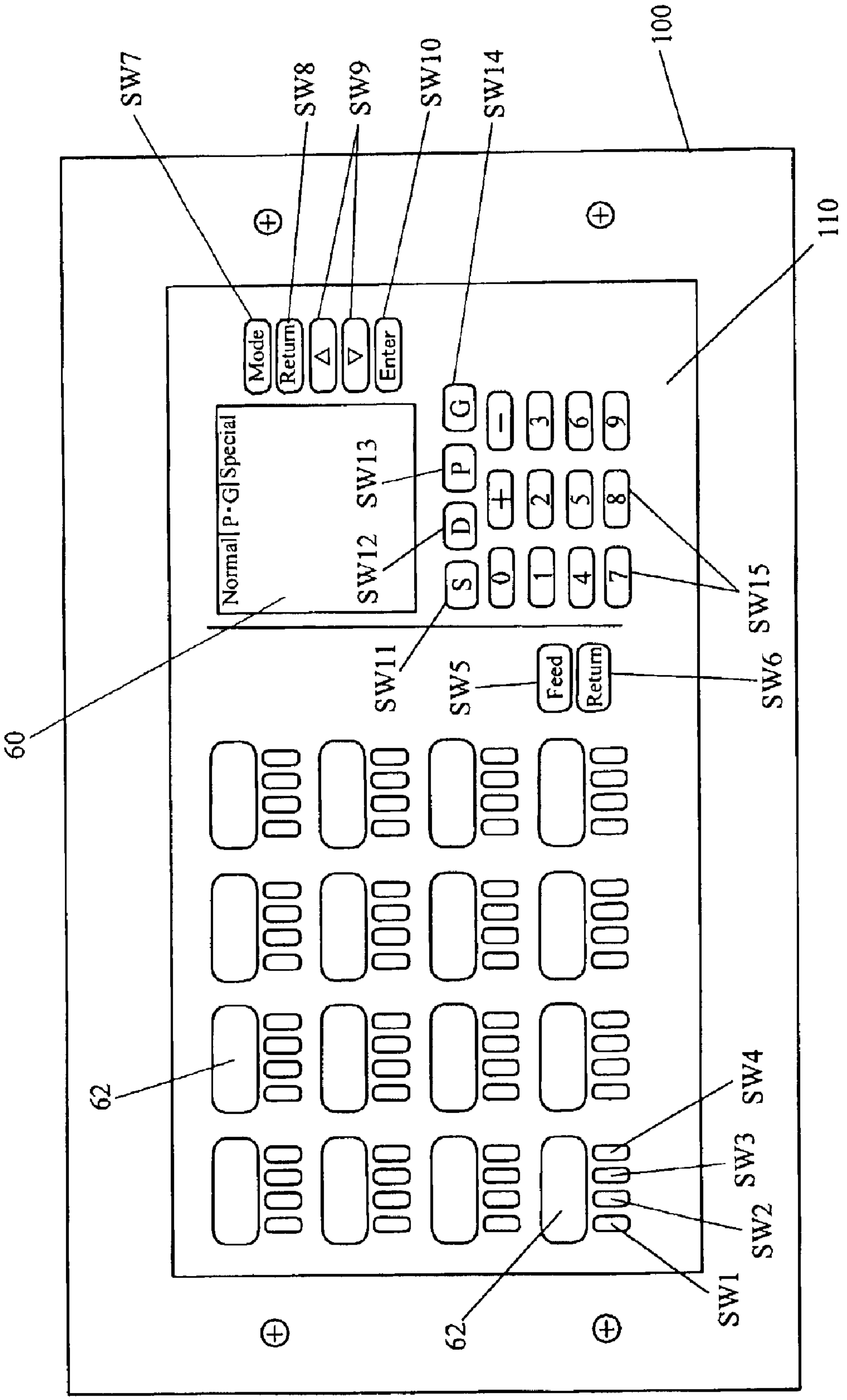
FIG. 4 is a front view of the selector switch.
Figure 5:
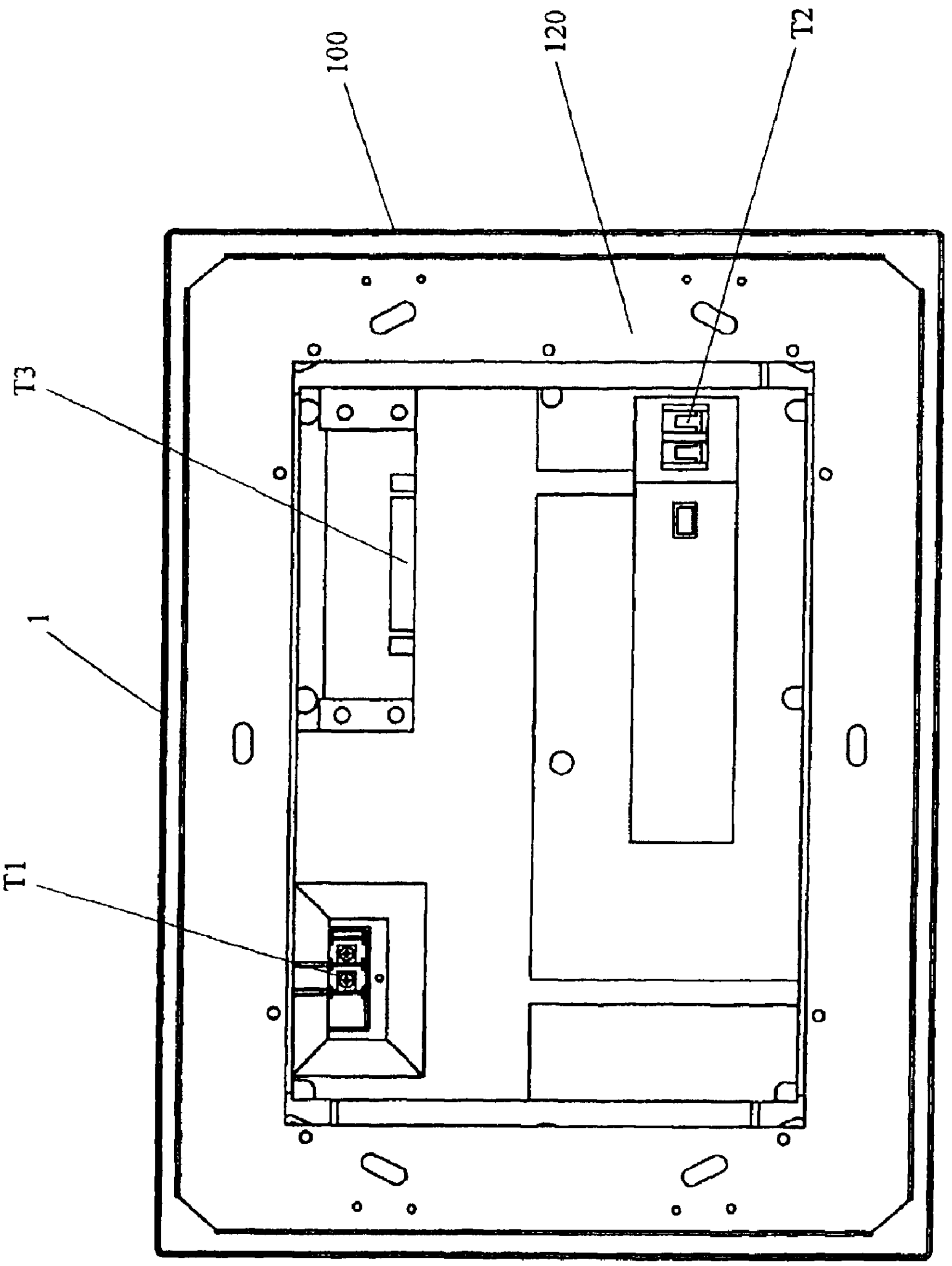
FIG. 5 is a rear view of the selector switch

Next, the selector switch for the supervisory remote control system of the present invention is explained in detail below. As shown in FIGS. 3 to 5, this selector 1 switch comprises a main unit 10 used to input/set control conditions and display the control conditions, a terminal unit 20 connected to the operation and control terminals (31, 32) through the two-line type signal line Ls, a dual port RAM 40 provided between the main unit and the terminal unit, and a power supply unit 50.

The main unit 10 includes a flash memory 11 for storing programs; a main CPU 12 for carrying out general functions of the selector switch according to a required program stored in the flash memory 11; a switch circuit 13 provided between the main CPU and various operation switches K disposed at a front face of a housing 100 of the selector switch 1, as shown in FIG. 4; a flash memory 14 for storing data of control conditions input by use of those operation switches; a RS232C driver circuit 15 used to output desired control conditions stored in the flash memory 14 to an external device by operation of those operation switches. In FIG. 1, the solid line designates address bus, and the dotted line designates data bus.

In addition, the main unit 10 further comprises an oscillating circuit 16 connected to the main CPU 12, a buzzer circuit 17 provided between the main CPU and a piezoelectric buzzer 17*a*, a RAM 18, a main display 60 disposed at a front face of the selector switch 1, a first LCD driver circuit 60*a* provided between the main display 60 and the main CPU, sub displays 62, a second LCD driver circuit 62*a* provided between the sub display and the main CPU 12, a watch dog timer 64 connected to the main CPU 12, and a RS232C connector T3 used to connect the RS232C driver circuit 15 to the external device (not shown) such as a personal computer or a printer.

The power supply unit 50 is mainly composed of a step-down transformer 51 for changing AC 100 V supplied to an power terminal T1 into AC 7V, and a power supply circuit 52 for conversing AC 7V provided from the transformer into DC 5V, and supplying the DC power to the main unit 10.

The terminal unit 20 comprises a transceiver circuit 21 connected to the two-line type signal line Ls through a signal terminal T2, a flash memory 22 for storing program, a transmission CPU 23 for giving and receiving signals through the transceiver circuit according to the program stored in the flash memory, and an oscillating circuit 24 connected to the transmission CPU 23. For example, when signals on the signal line Ls connected to the signal terminal T2 are monitored through the transceiver circuit 21 by use of polling processing of the transmission unit 30, required information described in detail below can be obtained. The obtained information is temporarily stored in the dual port RAM 40, and then stored in the flash memory 14 of the main unit 10.

The above components are housed in a housing 100 having an operation panel 110 shown in FIG. 4 at the front side and a connector panel 120 shown in FIG. 5 at the rear side.

The operation panel 110 is composed of a selector switch area, in which 16 (=4×4) sub displays 62 are arranged, and an operation switch area, in which the main display 60 and a plurality of input switches are arranged. Four switches SW1 to SW4 are provided adjacent to each of the sub displays 62. In this embodiment, by use of these four switches, it is possible to control the ON/OFF states of four loads. For example, when the switch SW1 (=operation terminal 31) is operated, information of the ON/OFF state of the load L connected to the control terminal 32 in an address correspondence with the switch SW1 can be displayed on the sub display 62.

According to the selector switch of the present embodiment, it is possible to control 256 control terminals at the maximum. That is, this selector switch has the capability of providing four control pages, in each of which 64 control terminals can be controlled at the maximum. Therefore, by operation of a page feed button SW5 or a page return button SW6, it is possible to control the 256 control terminals (=64×4) at the maximum.

In addition, on the operation switch area, there are operation buttons SW7 to SW10, which are respectively used to select the information to be provided on the main display 60, switch modes, move a cursor, or execute input conditions. In addition, as explained below, switch buttons SW11 to SW 14 arranged adjacent to the main display 60 are used to check or set the control modes of the loads L. Switch buttons SW15 are used to input numeral values.

In addition, on the connector panel side, there are the power terminal T1 connected to a commercial power source (AC100V), the signal terminal T2 connected to the two-line type signal line Ls, and the RS232C connector T3 for serial communication, which can be connected to the external device such as personal computers. In place of the connector T3 and the RS232C driver circuit 15, a PC card slot and a PC card driver circuit may be used. Alternatively, a recording medium such as floppy disk may be used in place of the PC card.

In the present invention, it is possible to output desired information from the selector switch to the external device such as a personal computer.

Figure 6:
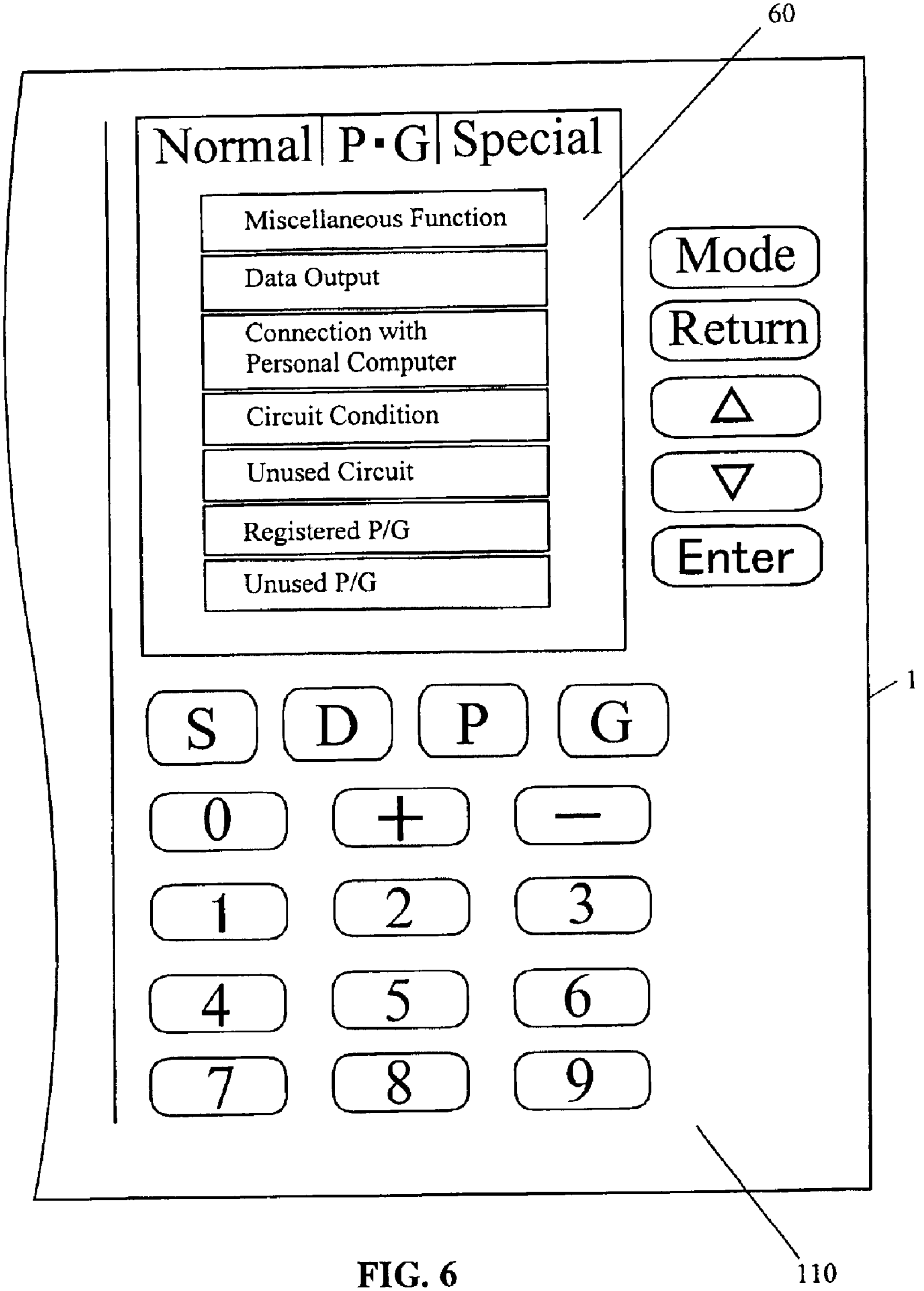
FIG. 6 is a partially-enlarged view of the selector switch.

That is, the user can select the item "Connection to Personal Computer" on the main display 60 by operating required switch buttons. In addition, when the user selects the item "Data Output", the following four items "Circuit Condition", "Unused Circuit", "Registered PG" and "Unused P/G" become available, as shown in FIG. 6.

The item "Circuit Condition" includes information of circuit conditions of the load L, i.e., an address correspondence between an operation terminal and the load that can be controlled by the operation terminal. By accumulating this information at a time interval, it is possible to understand busy conditions of the loads such as lighting apparatus. This is useful to consider energy conservation measures. For example, the information of "Circuit Condition" is obtained by monitoring each of the control terminals. The obtained information is temporarily stored in the dual port RAM 40, and then sent to the data flash memory 14. If necessary, the information of "Circuit Condition" can be output to the personal computer through the RS232C connector T3.

The item "Unused Circuit" includes address information of the control terminals 32 that is out of use for control of the load. By accumulating this information at a time interval, it is possible to avoid setting duplicate address in the case of adding loads to be controlled. For example, when monitoring each of the control terminal, and checking as to whether the control terminal returns a signal to the transmission unit, the address information of the control terminal not returning the signal is regarded as the information of "Unused Circuit". The obtained information is temporarily stored in the dual port RAM 40, and then sent to the data flash memory 14. If necessary, the information of "Unused Circuit" can be output to the personal computer through the RS232C connector T3.

The item "Registered P/G" includes information of a pattern address and/or a group address of the control terminals registered in the transmission unit 30. In other words, it is the information about the group control and/or the pattern control of the loads connected to the control terminals. This information is useful in the case of deleting the registered pattern control and/or the group control. If necessary, the information of "Registered P/G" can be output to the personal computer through the RS232C connector T3.

Specifically, in the supervisory remote control system of the present embodiment, it is possible to set 72 different pattern addresses (P1–P72), and 127 different group addresses (G1–G127). For example, when a load is operated by the pattern controls according to the pattern addresses P1, P12 and P15, and also operated by the group control according to the group addresses G1 and G7, these pattern and group address information (P1, P12, P15, G1, G7) are obtained as the information of "Registered P/G" of this load. The obtained information is temporarily stored in the dual port RAM 40, and then sent in the data flash memory 14.

The item "Unused P/G" includes information of a pattern address and/or a group address of the control terminal that is out of use for control of the loads. In other words, it is the information of the pattern address and/or a group address that has not registered in the transmission unit 30. This information is useful in the case of setting new pattern control and/or group control. The pattern address and/or the group address of the control terminal not received from the transmission unit 30 through the signal line Ls is regarded as the information of "Unused P/G". The obtained information is temporarily stored in the dual port RAM 40, and then sent to the data flash memory 14. If necessary, the information of "Unused P/G" can be output to the personal computer through the RS232C connector T3.

Therefore, according to the selector switch of the present invention, the above-explained information can be edited, modified, stored, or printed out, by use of a required software installed in the personal computer as the external device. In addition, when the information registered in the transmission unit 30 can be stored in the flash memory 14 of the selector switch, it is possible to transfer the information to the external device such as personal computer through the RS232C connector T3 of the selector switch, if necessary. Thus, the information stored in the transmission unit and/or the selector switch can be easily edited, modified, or printed out with use of the external device.

Moreover, in the case of checking or setting various data such as the address correspondence between each of the operation terminals 31 and the control terminal 31 that can be controlled by the operation terminal, and conditions of the pattern control and/or the group control, it is not necessary to set the data at the place that deployed of each control terminal 32. It is possible to set or modify control conditions of all of the loads at the place that deployed of the selector switch, and efficiently transfer the newly set data or the modified data to the transmission unit 30.

As described below, the selector switch of this embodiment can receive data prepared or edited with the personal computer as the external device, and store the data in the data flash memory 14 or transfer the data to the transmission unit 30. Thus, the selector switch of the present invention can provide a two-way data communication with the external device.

Figure 7:
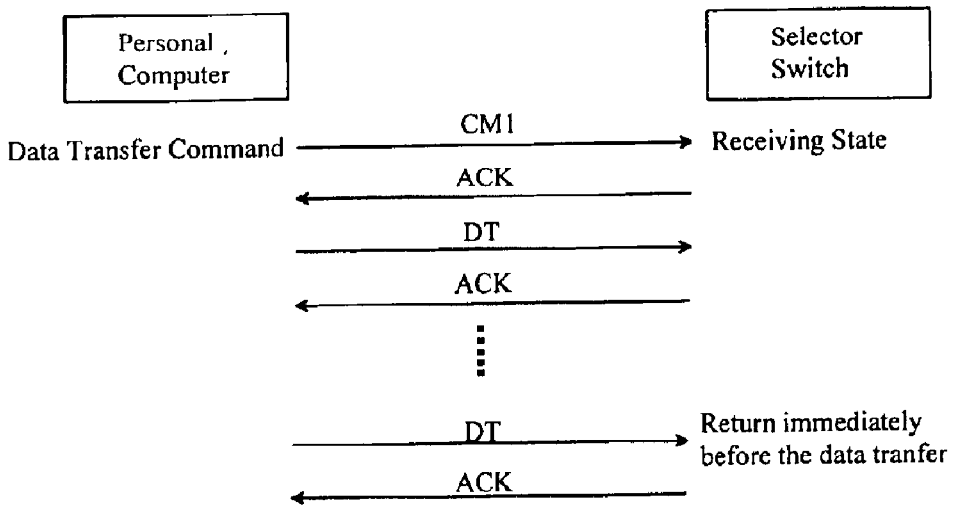
FIG. 7 is a diagram showing a procedure of data transfer from the selector switch to an external device.

As an example, a procedure of data transfer from the personal computer as the external device to the selector switch is explained referring to FIG. 7. In this case, a plurality of loads connected to the control terminals 32 can be controlled by operation of a single operation terminal 31, and a relation data including information of an address correspondence between the operation terminal and the control terminals controlled by the operation terminal is transferred.

First, the personal computer outputs a data transfer command CM1 to the selector switch. When the selector switch receives the data transfer command CM1, it stops another operations, and becomes a data receivable state that can receive data from the personal computer. Subsequently, the selector switch outputs an acknowledgement ACK to the personal computer. After the personal computer receives the acknowledgement ACK, it transfers a required relation data DT to the selector switch.

In this case, each of the operation terminals 31 is identified by a pattern number, e.g., "P2" or a group number, e.g., "G5" and each of the loads is identified by an address such as "2–1" or "3—3". Therefore, the relation data is a data having a variable length and represented as a set of the address of the load L and the pattern number or the group number of the operation terminal 31. The personal computer sends the relation data DT having an ending flag to the selector switch. When the selector switch receives the ending flag, it outputs the acknowledgement ACK to the personal computer.

When it is required to send another relation data to the selector switch, the above procedure may be repeated. When there is no relation data to be transferred from the personal computer to the selector switch, the personal computer sends a data transfer complete command to the selector switch, so that the selector switch returns the state of immediately before the data receivable state. Then, the selector switch outputs an acknowledgement ACK to the personal computer.

Figure 8:
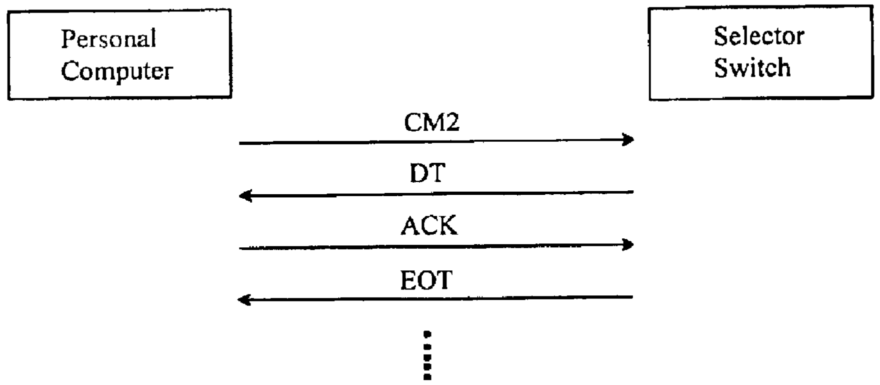
FIG. 8 is a diagram showing a procedure of data transfer from the external device to the selector switch.

On the other hand, a procedure of data transfer from the selector switch to the personal computer as the external device is explained referring to FIG. 8. In this case, the personal computer sends a data request command CM2 to the selector switch. The data request command CM2 includes the pattern number or the group number designating a requested relation data. When the selector switch receives the data request command CM2, a relation data DT corresponding to the pattern number or the group number is sent to the personal computer. At this time, the selector switch sends the relation data DT having an ending flag to the personal computer.

When the personal computer receives the ending flag, it returns an acknowledgement ACK informing that the reception of the relation data has been finished to the selector switch. Then, the selector switch sends, to the personal computer, an end-of-transmission signal EOT informing that the transmission of the requested relation data has been finished. When it is required to send another relation data to the personal computer, the above procedure may be repeated. According to the similar manner, it is possible to carry out the data transfer from the dual port RAM 40 to the personal computer.

Figure 9:
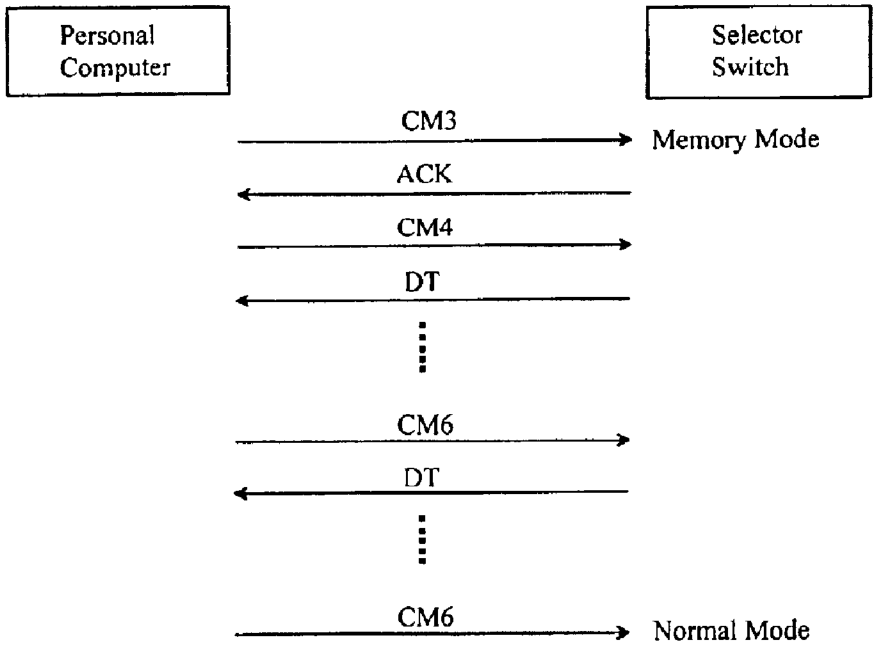
FIG. 9 is a diagram showing a procedure of checking as to whether data has been correctly written in a flash memory of the selector switch.

In addition, when an accident has occurred during the operation of writing the relation data into the data flash memory 14 of the selector switch, it is necessary for the user to check as to whether the relation data has been correctly written in the data flash memory 14, or whether the data flash memory 14 normally operates. In such a case, as shown in FIG. 9, the personal computer sends a memory mode request command CM3 to the selector switch.

When the selector switch receives the memory mode request command CM3, it outputs an acknowledgement ACK to the personal computer. After the personal computer receives this acknowledgement ACK, an address in the data flash memory 14 is designated, and a data memory reading command CM4 is sent to the selector switch. This address is a top address, from which data reading is started. As a result, data having a capacity of 128 bytes is read out from this address.

Thus, the selector switch reads the data DT of the designated address from the flash memory 14, and then sends the data to the personal computer as the external device. After the data transfer of the designated address is finished, an end-of-transmission signal EOT is sent to the personal computer. The memory mode request command CM3 and the data memory reading command CM4 are different from the data request command CM2 in the range that the data transfer is requested, but they are substantially same commands.

In addition, the data that the main unit 10 shares with the terminal unit 20 is written in the dual port RAM 40. That is, the data transmitted from the main CPU 12 to the transmission unit 30 through the transmission CPU 23, and the data received from the transmission unit 30 by the transmission CPU 23 are written in the dual port RAM 40.

Therefore, by reading out the data of the dual port RAM 40, and checking the contents of the data, it is possible to recognize as to whether the data written in the dual port RAM 40 by the main CPU 12 or the transmission CPU 23 is correct or not. This is useful to detect an abnormal operation of the selector switch, check operating states of the loads, or modify the program. The data transfer from the dual port RAM 40 to the external device such as the personal computer can be performed in a substantially same manner as the case of transferring the data of the data flash memory 14 to the external device.

By the way, as a control manner of the loads L under the supervisory remote control system described above, there are "Last-Operation Priority" control mode and "ON-Operation Priority" control mode.

Figure 10:
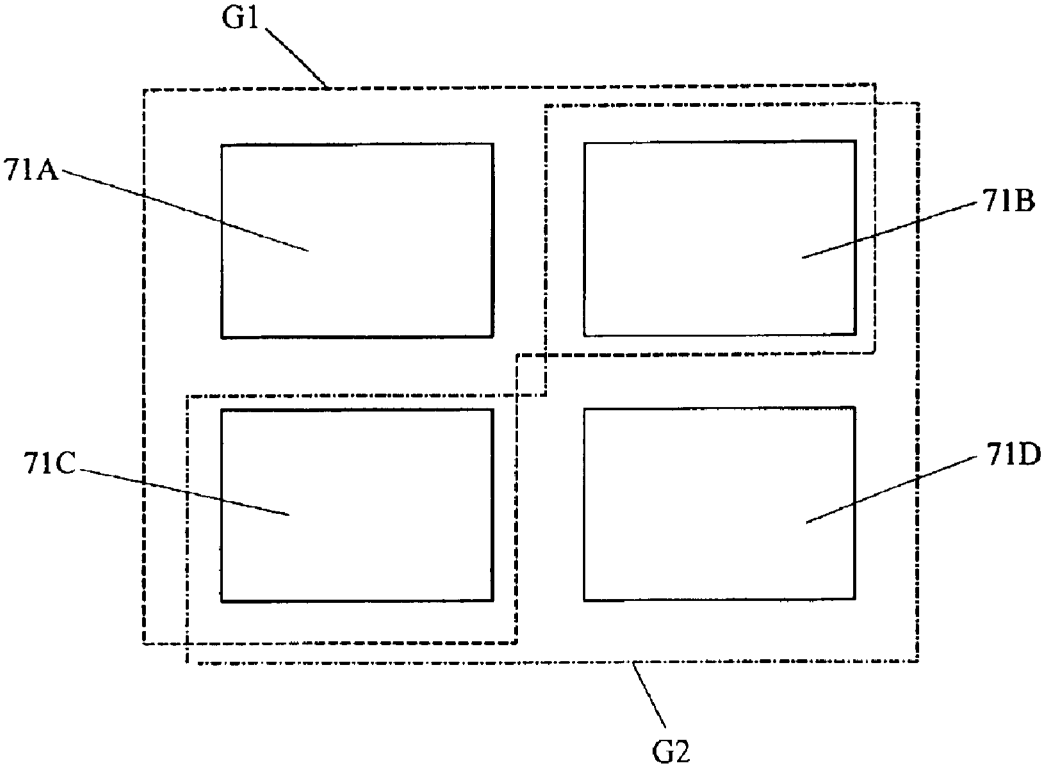
FIG. 10 is a schematic diagram explaining "Last-Operation Priority" control mode and "ON-Operation Priority" control mode.

For example, a group G1 of the loads 71A, 71B, 71C, and a group G2 of the loads 71B, 71C, 71D are defined, as shown in FIG. 10. All of the loads are in the OFF state as an initial condition. When a first operation terminal for controlling the loads of the group G1 is turned on, the loads 71A, 71B, 71C become the ON state. Next, when a second operation terminal for controlling the loads of the group G2 is turned on, the loads 71B, 71C, 71D become the ON state. At this time, all of the loads are in the ON state. Next, when the first operation terminal is turned off, the loads 71A, 71B, 71C become the OFF state, and the ON state of the load 71D is maintained. This is the "Last-Operation Priority" control mode.

On the other hand, when the first operation terminal is turned on under a condition that all of the loads 71A to 71D are in the OFF state, the loads 71A, 71B, 71C of the group G1 become the ON state. Next, when the second operation terminal is turned on, the loads 71B, 71C, 71D of the group G2 become the ON state. At this time, all of the loads are in the ON state. Then, when the first operation terminal is turned off, only the load 71A becomes the OFF state, but the loads 71B, 71C are still in the ON state because these loads belong to the group G2. Thus, with respect to the loads belonging to both of the groups G1 and G2, the ON operation of the second operation terminal have priority over the OFF operation of the first operation terminal. This is the "ON-Operation Priority" control mode.

These control modes are initially set in the transmission unit 30 prior to the application of the remote control system at construction site. Therefore, when changing the initially set program, it is required to use a dedicated setting device. However, according to the selector switch of the present invention, it is possible to readily change the control modes anytime.

A procedure of changing the control mode with the selector switch of the present invention is explained below. First, when the item "group control mode" is selected from a menu on the main display 60, it is possible to display the information of the group address and control conditions of the group address that have been registered in the transmission unit 30 at the time on the main display 60. This registered information is obtained from the transmission unit 30 through the signal line Ls.

For example, when the number "1" indicating the "Last-Operation Priority" control mode is changed on the main display 60 to the number "2" indicating the "ON-Operation Priority" control mode, and then data setting on the control mode is carried out, the change of the control mode is transferred to the transmission unit 30. That is, the new data of the control mode is sent from the main CPU 12 to the transmission CPU 23 through the dual port RAM 40, and then transferred from the transceiver circuit 21 to the transmission unit 30 through the signal line Ls. When the new data is received by the transmission unit 30, it is registered in a control table of a required group address. Thus, the procedure of changing the group control mode can be completed.

As a manner of indicating the ON/OFF state of the loads L under the supervisory remote control system described above, there are "Standard" mode, "Energy Conservation" mode, and "Group Display" mode. In this embodiment, each of the operation terminals has an ON/OFF indicator lamp for indicating the ON/OFF state of the load L controlled by use of the operation terminal.

When a switch operation for a plurality of the loads that are under the group control is carried out, the indicator lamp indicates the ON/OFF state corresponding to the switch operation. Therefore, for example, even when one of the loads that are under the group control accidentally becomes the OFF state, the indicator lamp keeps indicating the ON state. However, when all of the loads that are under the group control accidentally become the OFF (or ON) state, the indicator lamp changes the indicating content for the next switch operation. This indicating manner is the "Standard" mode.

On the other hand, when at least one of the loads is in the ON state under the group control, the indicator lamp indicates the ON state. Only when all of the loads under the group control is in the OFF state, the indicator lamp is indicates the OFF state. This indicating manner is the "Energy Conservation" mode. This mode is useful to monitor a waste of energy as energy conservation measures.

In addition, when at least one of the loads is in the OFF state under the group control, the indicator lamp indicates the OFF state. Only when all of the loads under the group control are in the ON state, the indicator lamp indicates the ON state. This indicating manner is the "Group Display" mode. This mode is useful to check as to whether all of the loads such as lighting device under the group control are normally operated in commercial and service establishments such as shopping mall.

These indicating manners are set in the transmission unit 30 prior to the application of the supervisory remote control system at construction sites. Therefore, when changing the initially set program, it is required to use a dedicated setting device. However, according to the selector switch of the present invention, it is possible to readily change the indicating manner anytime.

As an example, a procedure of changing the indicating mode with the selector switch of the present embodiment is explained below. First, when the item "Indicating Mode" is selected from a menu on the main display 60, the information of the group address and the indicating mode of the group address that have been registered in the transmission unit 30 can be displayed on the main display 60. The registered information is obtained from the transmission unit 30 through the signal line Ls.

For example, when the number "1" indicative of the "Standard" mode is changed on the main display 60 to the number "2" indicative of the "Energy Conservation" mode, and then data setting on the indicating mode is carried out, the change of the indicating mode is transferred to the transmission unit 30. That is, the new data of the indicating mode is sent from the main CPU 12 to the transmission CPU 23 through the dual port RAM 40, and then transferred from the transceiver circuit 21 to the transmission unit 30 through the signal line Ls. When the new data is received by the transmission unit 30, it is registered in a control table of a required group address. Thus, the procedure of changing the indicating mode can be completed.

Figure 11:
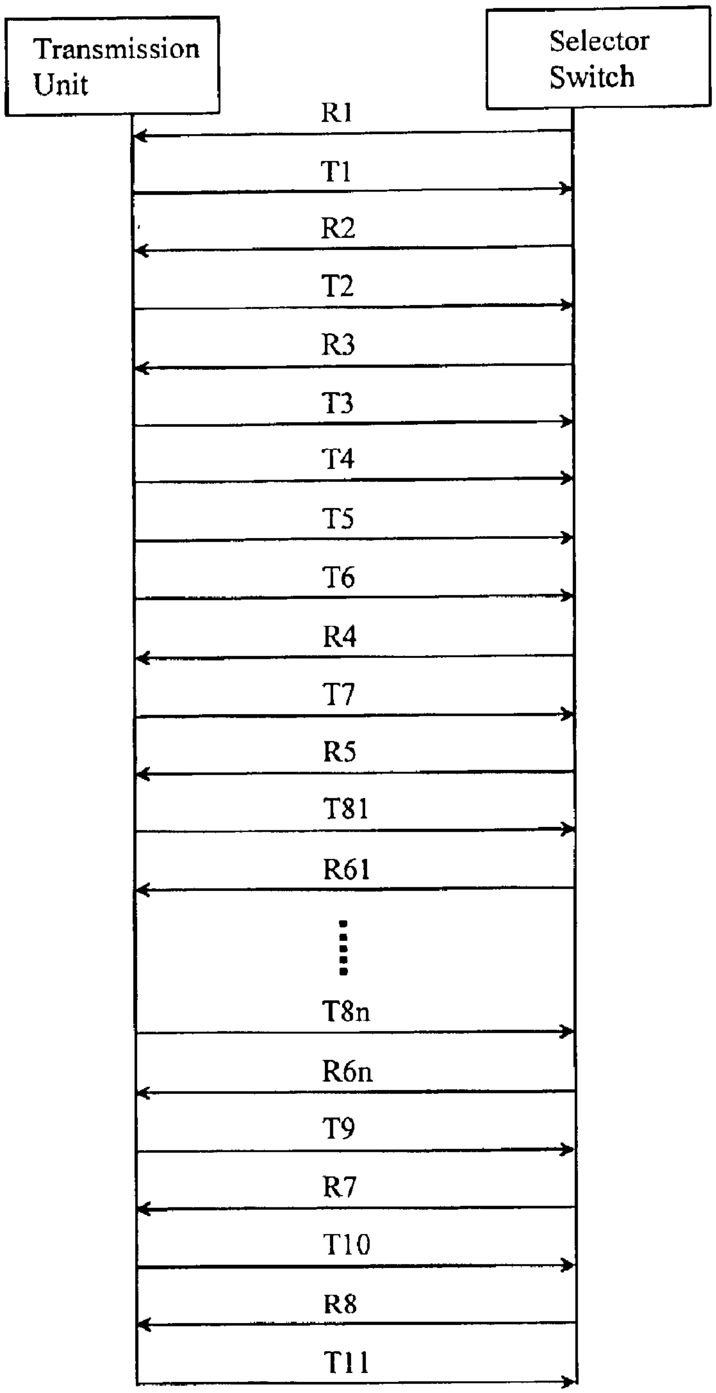
FIG. 11 is a diagram showing a procedure of data transfer between the selector switch and a transmission unit.

Next, a data transfer between the selector switch and the transmission unit in the case of changing the control mode or the indicating mode is explained. That is, as shown in FIG. 11, by operating required switch buttons of the selector switch, the selector switch generates an interrupt signal R1. The transmission unit 30 receives this interrupt signal, and sets an interrupt flag to carry out an interrupt polling T1.

The transmission unit 30 awaits a return signal R2 including an address information from the selector switch. When the transmission unit 30 receives the return signal, it monitors an interrupt request T2 of the selector switch. On the other hand, the selector switch requests receiving a set of the relation data R3 to the transmission unit 30. When the transmission unit 30 receives this request, it releases the interrupt flag T3.

In addition, the transmission unit 30 secures an address region having a capacity of 256 bytes to store setting data (including setting data of the group control in addition to the setting data of the control mode and the indicating mode). That is, in this embodiment, 256 bytes are defined as one page. When the address region of the one page is secured in the transmission unit 30, the address region used to register the setting data is notified to the selector switch T4. In addition, the transmission unit 30 instructs the start of transmitting the setting data T5. Subsequently, when the transmission unit 30 monitors the transmission state of the setting data from the selector switch T6, and receives a notification R4 that the selector switch can transmit the setting data, the data transfer is carried out.

In this data transfer, the setting data is transferred from the selector switch to the transmission unit 30. Concretely, the transmission unit 30 monitors a number of bytes of the data transferred from the selector switch T7, and awaits a return of byte counter from the selector switch R5. Subsequently, the transmission unit 30 monitors the setting data T81, and awaits receiving the setting data having a number of bytes designated by the byte counter from the selector switch R61.

In this case, all of the setting data is not transferred at a time. The setting data is divided into plural parts and then transferred. Therefore, the operations of monitoring (T81 to T8*n*) the setting data and receiving the setting data (R61 to R6*n*) from the selector switch are repeated unit the data transfer of the setting data having the number of bytes designated by the byte counter is completed. Finally, the transmission unit 30 requests check sum of the setting data to the selector switch T9. When the selector switch outputs the check sum R7, the presence or absence of a transmission error is checked. Thus, according to the contents of the setting data transferred from the selector switch to the transmission unit 30 in a divisional manner, a control table is prepared in the transmission unit 30.

In the transmission unit 30, the transmission state of the setting data from the selector switch is monitored T10, and it is checked that the data transfer has been completed R8. Then, the transmission unit 30 outputs a data-transfer end instruction to the selector switch T11.

As described above, when the setting data is transferred in the divisional manner, it is possible to efficiently transfer the setting data from the selector switch 1 to the transmission unit 30 with the affective use of unoccupied time that is not used for the control of the loads. In fact, since time required for the control of the loads is relatively short, there is a lot of unoccupied time not used for the control of the loads. Therefore, when the setting data is divided, and then transferred in order within the unoccupied time, it is possible to efficiently transfer the setting data to the transmission unit 30 without interrupting the control of the loads.

Figure 12:
FIG. 12 is a data format for the procedure of FIG. 11.

In addition, when it becomes necessary to control the loads during the data transfer of the setting data, the control of the loads has precedence over the data transfer of the setting data. Therefore, when the control of the loads is started, the transfer of the setting data is temporarily stopped. After the control of the loads is finished, the data transfer is continued again. As a result, it is possible to perform the data transfer without interrupting the control of the loads. An example of a data format in this data transfer is shown in FIG. 12. This data is comprised of byte counter BC, header for identifying data HD, receiving end address SA and transmitting end address DA in the data transfer, transfer data DT1 to DTn, and check sum SUM. These data are stored in the address region of the above-described one page in order from the lower side. When the data transfer of the setting data described above is carried out, only the byte counter BC, the transfer data DT1 to DTn and the check sum SUM are used.

In addition, the selector switch of the present invention comprises a function of displaying a version information of operation programs installed in the transmission unit 30 and the selector switch 1. In this case, it is possible to readily check the version information on the main display.

As an example, a procedure of checking the version information of the transmission unit 30 is explained below referring to FIG. 13. First, a request of displaying the version information is input in the main CPU 12 by operation of required switch buttons. Then, the main CPU 12 activates the transceiver circuit 21 to send an interrupt signal of requesting the version information to the transmission unit 30 through the signal line Ls. After the transmission unit 30 receives the interrupt signal, it carries out interrupt polling, so that an address information is returned from the selector switch 1. When the transmission unit 30 receives this address information, it monitors data corresponding to the interrupt request with respect to this address information. On the other hand, the selector switch 1 returns the data of the version request to the transmission unit 30 through a treatment at the transmission CPU 23.

According to the data received, the transmission unit 30 recognizes that it is the request of displaying the version information, and transfers an interrupt release data to the selector switch 1. In addition, the data of the version information read from a ROM installing the operation program of the transmission unit 30 is transferred to the selector switch 1.

After the data of version information is received by the transmission CPU 23 of the selector switch, it is sent to the main CPU 12 through the dual port RAM 40. According to the receiving data, the main CPU 12 allows the main display 60 to display the requested version information of the operation program of the transmission unit 30.

Figures 13, 14:
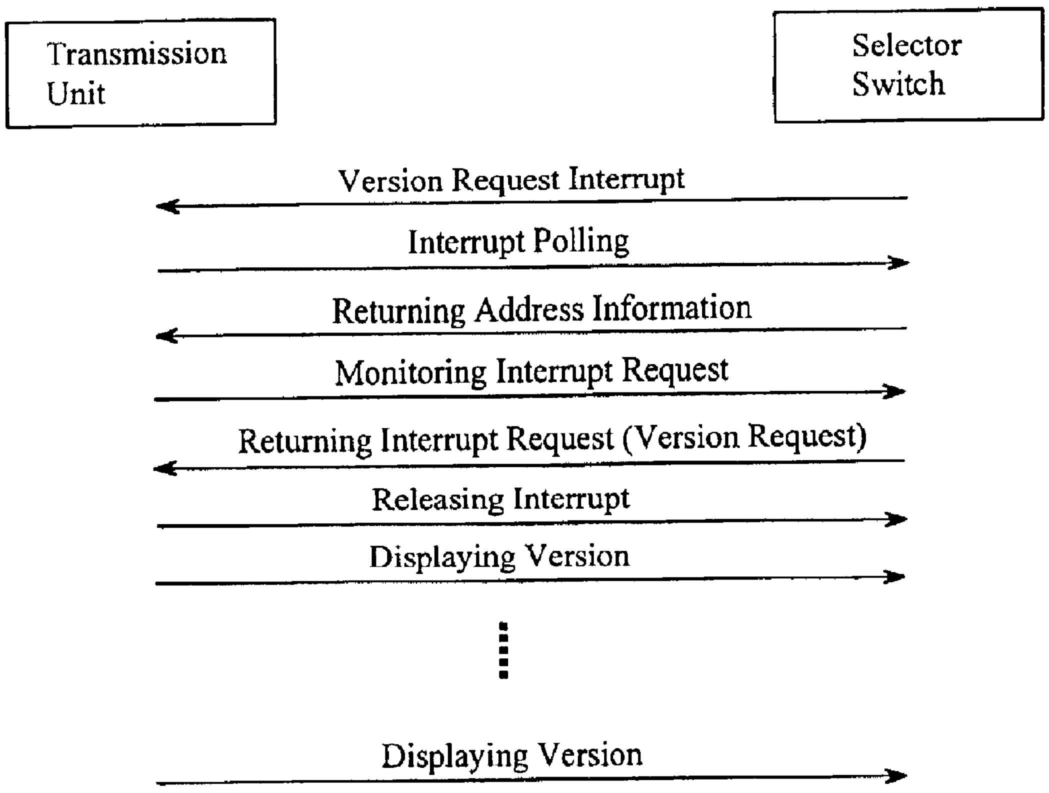
FIG. 13 is a diagram showing a procedure of checking a version information of the transmission unit.
FIG. 14 is a data format for the procedure of FIG. 13.
Figure 15:
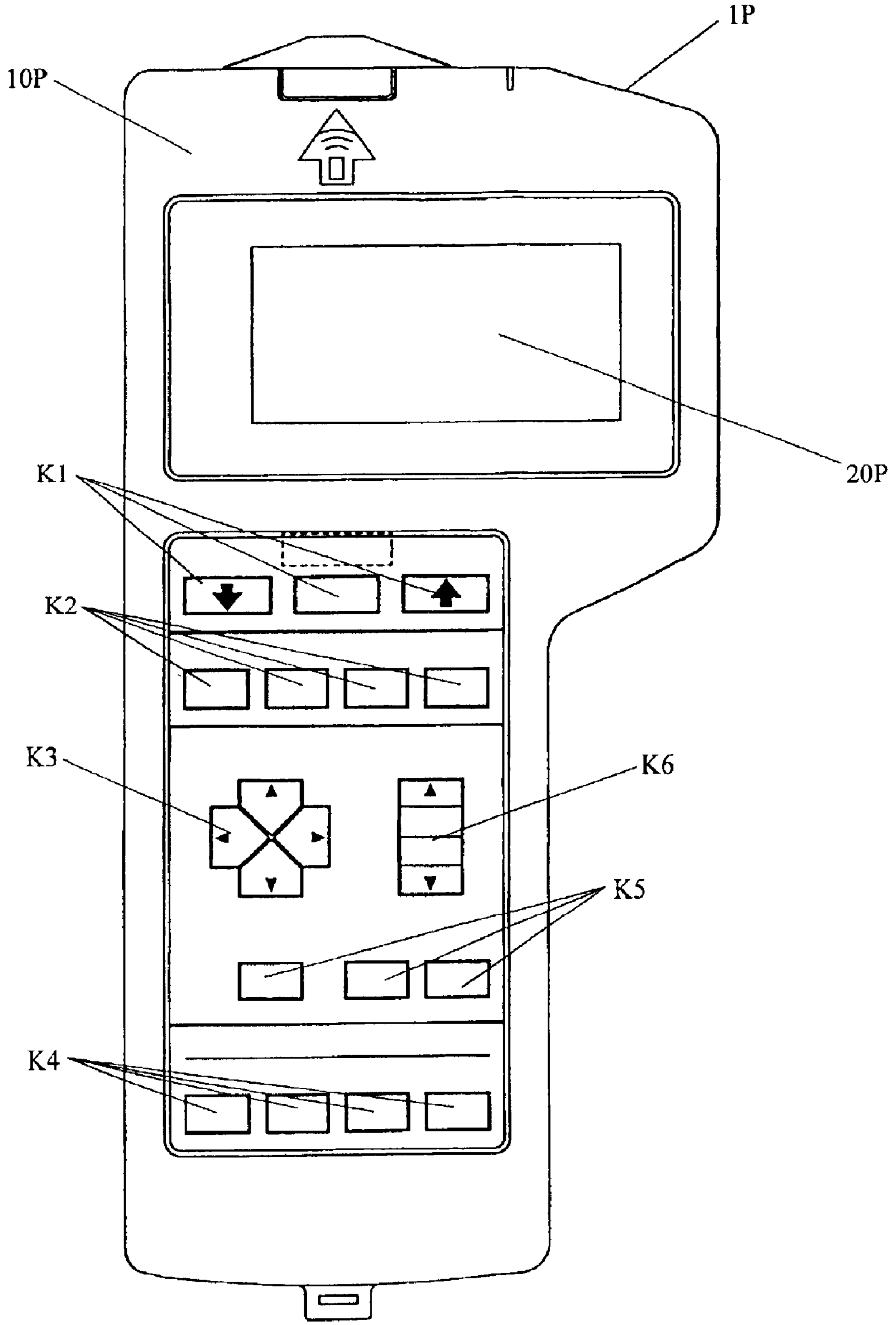
FIG. 15 is a front view of a conventional setting device for the supervisory remote control system.
Figure 16:
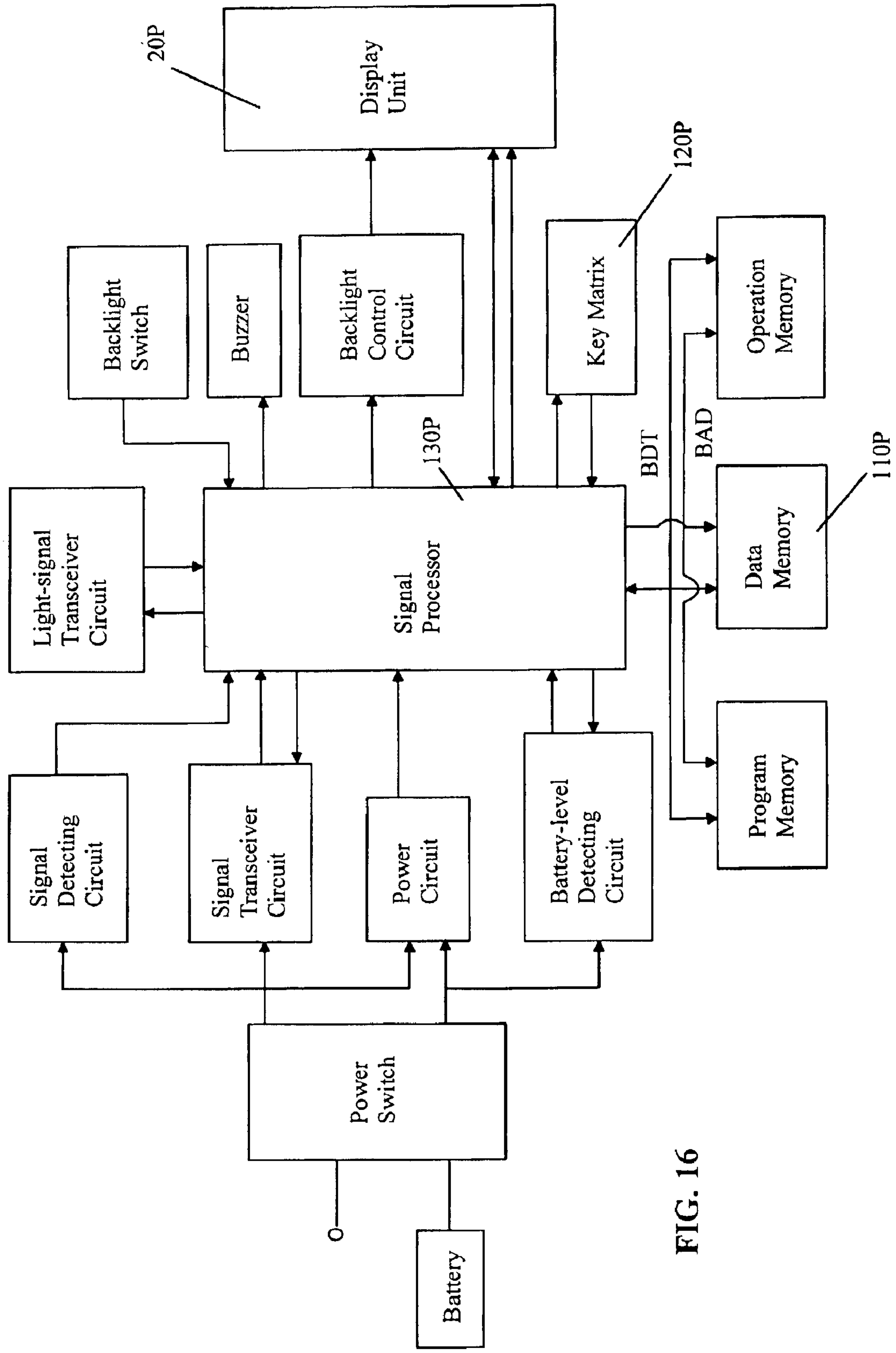
FIG. 16 is a simplified block diagram of the conventional setting device.

An example of the data of version information transferred from the transmission unit 30 is shown n FIG. 14. This data includes an ID number indicative of the transmission unit 30, a product code of the transmission unit, a version of the operation program, a release number, a parity and so on. These data can be displayed on the main display 60.

On the other hand, the version information of the selector switch 1 is stored in the flash memory 11 for programming. By operating required switch buttons of the selector switch, the version information can be displayed on the main display 60.

As explained above in detail, according to the selector switch of the present invention, it is possible to efficiently edit, modify or print out control conditions of all of loads under the supervisory remote control system with use of an external device such as personal computer and printer connected to the selector switch. Of course, the selector switch can provides various convenient functions of easily checking or setting the control conditions of the loads at the place that deployed of the selector switch. In addition, the selector switch can receive and store data prepared or edited with the external device, and then transfer the data to the transmission unit without retyping the data in the selector switch. Thus, the selector switch of the present invention can provide a two-way data communication with the external device.

What is claimed is:

1. A selector switch for a supervisory remote control system, wherein said control system comprises:

a plurality of operation terminals each having an individual address;

a plurality of control terminals each having an individual address;

a signal line connecting a signal transmission unit to said operation and control terminals; and said transmission unit configured to provide a control signal to said signal line according to a time-division-multiplexing manner such that when one of said operation terminals is operated, a load connected to one of said control terminals in an address correspondence with said operation terminal is controlled, each of the plurality of operation terminals having an indicator for indicating ON state and OFF state of the load controlled by operation of said operation terminal, wherein the selector switch comprises:

a data receiver configured to receive data including conditions of the loads connected to said control terminals from said transmission unit through said signal line;

memory configured to store the data received by said data receiver;

a selector configured to select desired information from the data in said memory;

an output unit configured to provide the desired information to an external device according to an order of said selectors;

an indicating-mode setting unit configured to set one of first and second indicating modes in said transmission unit through said signal line, said first indicating mode being defined as an indicating mode that the indicator of said operation terminal indicates OFF state when at least one of the loads in a predetermined region is in the OFF state, and indicates ON state only when all of the loads in the predetermined region are in the ON state, and said second indicating mode being defined as an indicating mode that the indicator of said operation terminal indicates ON state when at least one of the loads in the predetermined region is in the ON state, and indicates OFF state only when all of the loads in the predetermined region are in the OFF state.

2. The selector switch as set forth in claim 1, wherein said data receiver receives, as the data, at least one of a first control data of the loads under a group control, which is defined as a control manner that all of the loads in a predetermined region are turned on/off by operation of a single operation terminal, and a second control data of the loads under a pattern group, which is defined as a control manner that the loads in a predetermined region are turned on/off according to a pattern by operation of a single operation terminal.

3. The selector switch as set forth in claim 1, wherein said data receiver receives the data of an address correspondence between one of said operation terminals and the load(s) controlled by an operation of said operation terminal.

4. The selector switch as set forth in claim 1, wherein said data receiver receives, as the data, unused circuit information designating an address of the control terminal(s) that is out of use for control of the loads.

5. The selector switch as set forth in claim 2, wherein said data receiver receives, as the data, at least one of address information of said control terminals that are out of use for the group control of the loads, and address information of said control terminals that are out of use for the pattern control of the loads.

6. The selector switch as set forth in claim 2, wherein said data receiver receives, as the data, at least one of address information of said control terminals registered for the group control of the loads in said transmission unit and address information of said control terminals registered for the pattern control of the loads in said transmission unit.

7. The selector switch as set forth in claim 1, further comprising a control-mode setting means for setting one of first and second control modes in said transmission unit through said signal line, and wherein said first control mode is defined as a control mode that when an operation of one of said operation terminals for a first group control, in which all of the loads in a first region are controlled by the one of said operation terminals, and an operation of the other one of said operation terminals for a second group control, in which all of the loads in a second region including at least one load of the first region are controlled by the other one of said operation terminals are performed, one performed at a later time of the these operations determines the control of the loads included in both of the first and second regions, and said second control mode is defined as a control mode that when an ON operation of said operation terminal for the first group control and an OFF operation of said operation terminal for the second group control are performed, the ON operation has precedence over the OFF operation with respect to the control of the loads included in both of the first and second regions.

8. The selector switch as set forth in claim 1, further comprising means for displaying a version information of a program installed in said transmission unit.

9. The selector switch as set forth in claim 1, further comprising an input unit for receiving control data of the loads prepared by the external device, and a data transfer unit for sending the control data received by said input unit to said transmission unit.

10. A selector switch for a supervisory remote control system, wherein said control system comprises:

a plurality of operation terminals each having an individual address;

a plurality of control terminals each having an individual address;

a signal line connecting signal transmission means to said operation and control terminals; and said transmission means for providing a control signal to said signal line according to a time-division-multiplexing manner such that when one of said operation terminals is operated, a load connected to one of said control terminals in an address correspondence with said operation terminal is controlled, each of the plurality of operation terminals having an indicator for indicating ON state and OFF state of the load controlled by operation of said operation terminal, wherein the selector switch comprises:

data receiving means for receiving data including conditions of the loads connected to said control terminals from said transmission unit through said signal line;

memory means for storing the data received by said data receiving means;

selecting means for selecting desired information from the data in said memory means;

output means for providing the desired information to an external device according to an order of said selecting means;

indicating-mode setting means for setting one of first and second indicating modes in said transmission means through said signal line, said first indicating mode being defined as an indicating mode that the indicator of said operation terminal indicates OFF state when at least one of the loads in a predetermined region is in the OFF state, and indicates ON state only when all of the loads in the predetermined region are in the ON state, and said second indicating mode being defined as an indicating mode that the indicator of said operation terminal indicates ON state when at least one of the loads in the predetermined region is in the ON state, and indicates OFF state only when all of the loads in the predetermined region are in the OFF state.

11. The selector switch as set forth in claim 10, further comprising a control-mode setting unit configured to set one of first and second control modes in said transmission means through said signal line, and wherein said first control mode is defined as a control mode that when an operation of one of said operation terminals for a first group control, in which all of the loads in a first region are controlled by the one of said operation terminals, and an operation of the other one of said operation terminals for a second group control, in which all of the loads in a second region including at least one load of the first region are controlled by the other one of said operation terminals are performed, one performed at a later time of the these operations determines the control of the loads included in both of the first and second regions, and said second control mode is defined as a control mode that when an ON operation of said operation terminal for the first group control and an OFF operation of said operation terminal for the second group control are performed, the ON operation has precedence over the OFF operation with respect to the control of the loads included in both of the first and second regions.

12. The selector switch as set forth in claim 11, further comprising a display configured to display a version information of a program installed in said transmission means.

13. The selector switch as set forth in claim 11, further comprising an input unit configured to receive control data of the loads prepared by the external device, and a data transfer unit configured to send the control data received by said input unit to said transmission means.

* * * * *

UNITED STATES PATENT AND TRADEMARK OFFICE

CERTIFICATE OF CORRECTION

PATENT NO. : 6,954,151 B2 
DATED : October 11, 2005
INVENTOR(S) : Mototsugu Kawamata et al.

It is certified that error appears in the above-identified patent and that said Letters Patent is hereby corrected as shown below:

Column 15,
Line 61, change "selectors" to -- selector --.

Column 17,
Line 23, change "unit" to -- means --.

Signed and Sealed this

Thirtieth Day of May, 2006

JON W. DUDAS
*Director of the United States Patent and Trademark Office*